UNITED STATES PATENT OFFICE

JAMES BADDILEY AND ERNEST CHAPMAN, OF BLACKLEY, MANCHESTER, ENGLAND, ASSIGNORS TO BRITISH DYESTUFFS CORPORATION LIMITED, OF BLACKLEY, MANCHESTER, ENGLAND

MANUFACTURE OF WATER SOLUBLE SULPHONIC ACIDS OF MINERAL OILS

No Drawing. Application filed July 14, 1927, Serial No. 205,833, and in Great Britain September 20, 1926.

In a co-pending application, Ser. No. 195,585, filed May 31, 1927, we have shown that if suitable fractions of a raw or purified mineral oil, or fractions obtained from such oil during the process of purification or cracking, are sulphonated and condensed with a suitable aliphatic, alicyclic or aralkyl alcohol, products are obtained having properties which render them of great value in industrial processes, for example, as wetting-out agents and the like. When treating with alcohol, we employ petroleum fractions having a boiling point range of 150° to 300° C.

We have now found that by careful selection of the petroleum fraction employed, substances having like valuable properties are obtained by subjecting such fractions to the process of sulphonation only, condensation with an alcohol being omitted. The petroleum fractions suitable for the purpose of this invention are those belonging to the classes defined above, but possessing an initial boiling point not lower than 200° C., and preferably above 240° C. The products obtained according to our invention, both as free acid and as salts, are easily soluble in water but practically insoluble in organic solvents such as benzene. The calcium salts are soluble in water.

We are aware that mineral oils, etc., have previously been sulphonated to give products useful in the leather and other industries, but the present invention consists in utilizing only those petroleum fractions boiling above a certain minimum temperature, the products obtained in these cases alone showing wetting-out properties sufficient to render them valuable. The importance of this selection is apparent from the following experimental results, obtained with the oil extracted by an ordinary commercial process from Borneo petroleum using liquid sulfur dioxide:

| Oil sulphonated | Wetting-out action in 1% solution. |
|---|---|
| Fraction, B. P. 150–200° C. | Nil. |
| Fraction, B. P. 150–300° C. | Practically nil. |
| Fraction, B. P. 260–275° C. | Very strongly marked. |
| Fraction, B. P. 275–300° C. | Very strongly marked. |

The method of carrying out our invention is illustrated but not limited by the following examples, in which the parts are by weight:

Example 1

40 parts of that portion of the oil extracted from Borneo petroleum by means of liquid sulfur dioxid according to the Edeleanu process, which boils between 275–300° C., are added to 74 parts of monohydrate of sulfuric acid or weak oleum (101.5 per cent) during one hour with stirring. After a further hour, the mixture is warmed to 60–65° C. for four hours with continuous stirring. After allowing the mixture to settle, the upper layer of unsulphonated oil is removed (8 parts) and the acid layer is poured into water, precipitated with lime, and the clear solution then treated with just the necessary amount of sodium carbonate to convert the product into the sodium salt. The aqueous solution, on evaporation, leaves 49 parts of a light colored neutral product, which shows remarkable wetting-out properties in a solution of about 1 per cent concentration.

Example 2

That fraction of the oil specified above, but which boils at 260–275° C., is sulphonated and worked up as described in Example 1. The product possesses wetting-out properties only slightly inferior to those shown by the product from the previous example.

Example 3

40 parts of oil, known as "recharging stock" obtained in the "cracking" process, and boiling approximately between the temperature limits of 200–270° C., are added to 74 parts of monohydrate of sulfuric acid or weak oleum (101.5 per cent) during one hour with stirring. After a further hour, sulphonation is continued by heating for two hours at 60–65° C. with vigorous stirring. The mixture is added to water, unsulphonated oil (16 parts) is removed, and the sulphonated product is isolated as sodium salt via the calcium salt in the usual manner.

A 1 per cent aqueous solution of the product is bright yellow and clear, and has good wetting-out properties.

*Example 4*

24 parts of fuel oil (B. P. 230–350° C.) obtained from the "still residue" of the cracking process, and which has been refined by shaking with 90 per cent $H_2SO_4$, washing and distilling, are added during one hour to 45 parts monohydrate of sulfuric acid or weak oleum (101.5 per cent) and sulphonated as described in Example 1. After removal of unsulphonated oil, a completely sulphonated product is isolated in the form of its sodium salt, dried and powdered. In aqueous solution of about 1 per cent strength, it possesses extraordinary wetting-out action.

What we claim and desire to secure by Letters Patent is:—

1. In the manufacture of substances possessing wetting out properties, the process which comprises sulphonating a sulphur dioxide extract of mineral oil boiling above 260° C. and isolating a soluble salt of the product formed thereby, the amount of sulphonating agent used in the process being somewhat greater than that of the said sulphur dioxide extract.

2. In the manufacture of substances possessing wetting out properties, the process which comprises sulphonating a sulphur dioxide extract of Borneo petroleum, and isolating a soluble salt of the product formed thereby, the amount of sulphonating agent used in the process being somewhat greater than that of the said sulphur dioxide extract.

3. In the manufacture of substances possessing wetting out properties, the process which comprises adding monohydrate of sulphuric acid to a somewhat smaller proportion of a sulphur dioxide extract of mineral oil boiling between 275° and 300° C., heating the mixture under conditions of agitation and separating the resulting sulphonated product.

4. As an article of manufacture, a derivative of a sulphonated sulphur dioxide extract of a mineral oil boiling above 260° C., characterized by possessing wetting-out properties, such derivative being easily soluble in water, both in the form of the free acid and as salts.

5. As an article of manufacture, a derivative of a sulphonated sulphur dioxide extract of Borneo petroleum, characterized by possessing wetting-out properties, such derivative being easily soluble in water, both in the form of the free acids and as salts.

6. As an article of manufacture, a derivative of a sulphonated sulphur dioxide extract of a mineral oil boiling between 275° and 300° C., characterized by possessing wetting-out properties, such derivative being easily soluble in water, both in the form of the free acids and as salts.

In testimony whereof we affix our signatures.

JAMES BADDILEY.
ERNEST CHAPMAN.